(12) United States Patent
Janbakhsh et al.

(10) Patent No.: US 8,902,568 B2
(45) Date of Patent: Dec. 2, 2014

(54) POWER SUPPLY INTERFACE SYSTEM FOR A BREATHING ASSISTANCE SYSTEM

(75) Inventors: Mahmoud Janbakhsh, San Ramon, CA (US); Mark Jacobus Van Kerkwyk, Fremont, CA (US); Himanshu J. Chokshi, Fremont, CA (US)

(73) Assignee: Covidien LP, Mansfield, MA (US)

( * ) Notice: Subject to any disclaimer, the term of this patent is extended or adjusted under 35 U.S.C. 154(b) by 1062 days.

(21) Appl. No.: 11/535,890

(22) Filed: Sep. 27, 2006

(65) Prior Publication Data

US 2008/0083644 A1   Apr. 10, 2008

(51) Int. Cl.
*H02B 5/00* (2006.01)
*H01M 2/10* (2006.01)

(52) U.S. Cl.
CPC ................ *H01M 2/1066* (2013.01)
USPC .......................... 361/615; 361/616

(58) Field of Classification Search
USPC ............ 320/114; 340/693.7, 693.9, 693.11, 340/693.12; 361/615, 616; 429/97, 99
See application file for complete search history.

(56) References Cited

U.S. PATENT DOCUMENTS

| | | |
|---|---|---|
| 3,796,951 A | 3/1974 | Joseph |
| 4,497,881 A | 2/1985 | Bertolino |
| 4,559,456 A | 12/1985 | Yamamoto et al. |
| 4,662,736 A | 5/1987 | Taniguchi et al. |
| 4,752,089 A | 6/1988 | Carter |
| 4,921,642 A | 5/1990 | LaTorraca |
| 4,954,799 A | 9/1990 | Kumar |
| 4,965,462 A | 10/1990 | Crawford |
| 5,015,544 A | 5/1991 | Burroughs et al. |
| 5,057,822 A | 10/1991 | Hoffman |
| 5,072,737 A | 12/1991 | Goulding |
| 5,118,962 A | 6/1992 | Ishii et al. |
| 5,149,603 A | 9/1992 | Fleming et al. |
| 5,149,604 A | 9/1992 | Nakanishi ........................ 429/97 |
| 5,150,291 A | 9/1992 | Cummings et al. |

(Continued)

FOREIGN PATENT DOCUMENTS

| | | | |
|---|---|---|---|
| EP | 0 825 520 A1 | 2/1998 | ................ G06F 1/26 |
| GB | 2 311 408 A | 9/1997 | .............. H01M 2/10 |
| WO | WO 9617425 | 8/1996 | |
| WO | WO 9834314 | 8/1998 | |

OTHER PUBLICATIONS

International Search Report and Written Opinion PCT/US2007/079315, 14 pages, Apr. 15, 2008.

(Continued)

*Primary Examiner* — Timothy A Musselman (57) ABSTRACT

A power supply interface system for a medical device may include a battery compartment and a battery interlocking system. The battery compartment may define at least a first battery area and a second battery area, the first battery area configured to receive a first battery and the second battery area configured to receive a second battery. The battery interlocking system may include a first interlock mechanism including a first locking portion and a first selector. The first locking portion may be configured to move between a locking position and a non-locking position, the locking position substantially preventing removal of the first battery from the first battery area, and the non-locking position not preventing removal of the first battery from the first battery area. The first selector may be configured to move the first locking portion from the locking position to the non-locking position in response to the second battery being received in the second battery area.

18 Claims, 8 Drawing Sheets

(56) References Cited

U.S. PATENT DOCUMENTS

| | | | |
|---|---|---|---|
| 5,156,931 A | 10/1992 | Burroughs et al. | |
| 5,159,272 A | 10/1992 | Rao et al. | |
| 5,161,525 A | 11/1992 | Kimm et al. | |
| 5,216,371 A | 6/1993 | Nagai | |
| 5,237,987 A | 8/1993 | Anderson et al. | |
| 5,244,754 A | 9/1993 | Bohmer et al. | |
| 5,256,500 A | 10/1993 | Ishimoto | |
| 5,258,901 A | 11/1993 | Fraidlin | |
| 5,271,389 A | 12/1993 | Isaza et al. | |
| 5,279,549 A | 1/1994 | Ranford | |
| 5,283,137 A | 2/1994 | Ching | |
| 5,299,568 A | 4/1994 | Forare et al. | |
| 5,301,921 A | 4/1994 | Kumar | |
| 5,306,956 A | 4/1994 | Ikeda et al. | |
| 5,308,715 A | 5/1994 | Aronne | |
| 5,315,228 A | 5/1994 | Hess et al. | |
| 5,319,540 A | 6/1994 | Isaza et al. | |
| 5,325,861 A | 7/1994 | Goulding | |
| 5,328,781 A * | 7/1994 | Mikake | 429/97 |
| 5,333,606 A | 8/1994 | Schneider et al. | |
| 5,339,807 A | 8/1994 | Carter | |
| 5,343,857 A | 9/1994 | Schneider et al. | |
| 5,348,813 A | 9/1994 | Bohmer et al. | |
| 5,350,640 A | 9/1994 | Masui | |
| 5,351,522 A | 10/1994 | Lura | |
| 5,357,946 A | 10/1994 | Kee et al. | |
| 5,368,019 A | 11/1994 | LaTorraca | |
| 5,369,802 A | 11/1994 | Murray | |
| 5,372,898 A | 12/1994 | Atwater et al. | |
| 5,383,449 A | 1/1995 | Forare et al. | |
| 5,385,142 A | 1/1995 | Brady et al. | |
| 5,389,470 A | 2/1995 | Parker et al. | |
| 5,390,666 A | 2/1995 | Kimm et al. | |
| 5,401,135 A | 3/1995 | Stoen et al. | |
| 5,402,796 A | 4/1995 | Packer et al. | |
| 5,407,174 A | 4/1995 | Kumar | |
| 5,413,110 A | 5/1995 | Cummings et al. | |
| 5,418,085 A | 5/1995 | Huhndorff et al. | |
| 5,438,980 A | 8/1995 | Phillips | |
| 5,443,075 A | 8/1995 | Holscher | |
| 5,448,152 A | 9/1995 | Albright | |
| 5,449,567 A | 9/1995 | Yeh | |
| 5,460,901 A | 10/1995 | Syrjala | |
| 5,478,665 A | 12/1995 | Burroughs et al. | |
| 5,496,658 A | 3/1996 | Hein et al. | |
| 5,513,631 A | 5/1996 | McWilliams | |
| 5,514,946 A | 5/1996 | Lin et al. | |
| 5,517,983 A | 5/1996 | Deighan et al. | |
| 5,520,071 A | 5/1996 | Jones | |
| 5,524,615 A | 6/1996 | Power | |
| 5,525,439 A | 6/1996 | Huhndorff et al. | |
| 5,531,221 A | 7/1996 | Power | |
| 5,542,415 A | 8/1996 | Brody | |
| 5,544,674 A | 8/1996 | Kelly | |
| 5,549,106 A | 8/1996 | Gruenke et al. | |
| 5,596,278 A | 1/1997 | Lin | |
| 5,596,984 A | 1/1997 | O'Mahony et al. | |
| 5,610,497 A | 3/1997 | Croughwell | |
| 5,630,411 A | 5/1997 | Holscher | |
| 5,632,270 A | 5/1997 | O'Mahony et al. | |
| 5,635,813 A | 6/1997 | Shiga et al. | |
| 5,640,150 A | 6/1997 | Atwater | |
| 5,641,587 A | 6/1997 | Mitchell et al. | |
| 5,645,048 A | 7/1997 | Brodsky et al. | |
| 5,656,919 A | 8/1997 | Proctor et al. | |
| 5,660,171 A | 8/1997 | Kimm et al. | |
| 5,664,560 A | 9/1997 | Merrick et al. | |
| 5,664,562 A | 9/1997 | Bourdon | |
| 5,671,767 A | 9/1997 | Kelly | |
| 5,672,041 A | 9/1997 | Ringdahl et al. | |
| 5,673,689 A | 10/1997 | Power | |
| 5,677,077 A | 10/1997 | Faulk | |
| 5,715,812 A | 2/1998 | Deighan et al. | |
| 5,738,954 A | 4/1998 | Latella et al. | |
| 5,762,480 A | 6/1998 | Adahan | |
| 5,771,884 A | 6/1998 | Yarnall et al. | |
| 5,789,100 A | 8/1998 | Burroughs et al. | |
| 5,791,339 A | 8/1998 | Winter | |
| 5,794,986 A | 8/1998 | Gansel et al. | |
| 5,813,399 A | 9/1998 | Isaza et al. | |
| 5,567,541 A | 10/1998 | Rouham | |
| 5,824,431 A * | 10/1998 | Tsurumaru et al. | 429/97 |
| 5,825,100 A | 10/1998 | Kim | |
| 5,826,575 A | 10/1998 | Lall | |
| 5,829,441 A | 11/1998 | Kidd et al. | |
| 5,861,812 A | 1/1999 | Mitchell et al. | |
| 5,864,938 A | 2/1999 | Gansel et al. | |
| 5,865,168 A | 2/1999 | Isaza | |
| 5,867,007 A | 2/1999 | Kim | |
| 5,881,717 A | 3/1999 | Isaza | |
| 5,881,723 A | 3/1999 | Wallace et al. | |
| 5,884,623 A | 3/1999 | Winter | |
| 5,909,731 A | 6/1999 | O'Mahony et al. | |
| 5,915,379 A | 6/1999 | Wallace et al. | |
| 5,915,380 A | 6/1999 | Wallace et al. | |
| 5,915,382 A | 6/1999 | Power | |
| 5,918,597 A | 7/1999 | Jones et al. | |
| 5,921,238 A | 7/1999 | Bourdon | |
| 5,934,274 A | 8/1999 | Merrick et al. | |
| 5,939,799 A | 8/1999 | Weinstein | |
| 5,978,236 A | 11/1999 | Faberman et al. | |
| 6,024,089 A | 2/2000 | Wallace et al. | |
| 6,041,780 A | 3/2000 | Richard et al. | |
| 6,045,398 A | 4/2000 | Narita et al. | |
| 6,047,860 A | 4/2000 | Sanders | |
| 6,054,234 A | 4/2000 | Weiss et al. | |
| 6,057,055 A * | 5/2000 | Kumagawa | 429/97 |
| 6,076,523 A | 6/2000 | Jones et al. | |
| 6,084,380 A | 7/2000 | Burton | |
| 6,116,240 A | 9/2000 | Merrick et al. | |
| 6,116,464 A | 9/2000 | Sanders | |
| 6,123,073 A | 9/2000 | Schlawin et al. | |
| 6,135,106 A | 10/2000 | Dirks et al. | |
| 6,142,150 A | 11/2000 | O'Mahoney et al. | |
| 6,153,947 A | 11/2000 | Rockow et al. | |
| 6,156,450 A | 12/2000 | Bailey | |
| 6,161,539 A | 12/2000 | Winter | |
| 6,220,245 B1 | 4/2001 | Takabayashi et al. | |
| 6,232,782 B1 | 5/2001 | Kacprowicz et al. | |
| 6,259,171 B1 | 7/2001 | Cheng | |
| 6,269,812 B1 | 8/2001 | Wallace et al. | |
| 6,273,444 B1 | 8/2001 | Power | |
| 6,283,119 B1 | 9/2001 | Bourdon | |
| 6,304,005 B1 | 10/2001 | Aoki et al. | |
| 6,305,373 B1 | 10/2001 | Wallace et al. | |
| 6,321,748 B1 | 11/2001 | O'Mahoney | |
| 6,325,785 B1 | 12/2001 | Babkes et al. | |
| 6,330,176 B1 | 12/2001 | Thrap et al. | |
| 6,357,438 B1 | 3/2002 | Hansen | |
| 6,360,745 B1 | 3/2002 | Wallace et al. | |
| 6,369,838 B1 | 4/2002 | Wallace et al. | |
| 6,384,491 B1 | 5/2002 | O'Meara | |
| 6,412,483 B1 | 7/2002 | Jones et al. | |
| 6,421,885 B1 * | 7/2002 | Mowers et al. | 24/3.12 |
| 6,439,229 B1 | 8/2002 | Du et al. | |
| 6,467,478 B1 | 10/2002 | Merrick et al. | |
| 6,509,657 B1 | 1/2003 | Wong et al. | |
| 6,546,930 B1 | 4/2003 | Emerson et al. | |
| 6,553,991 B1 | 4/2003 | Isaza | |
| 6,557,553 B1 | 5/2003 | Borrello | |
| 6,571,795 B2 | 6/2003 | Bourdon | |
| 6,603,273 B1 | 6/2003 | Wickham et al. | |
| 6,622,726 B1 | 9/2003 | Du | |
| 6,644,310 B1 | 11/2003 | Delache et al. | |
| 6,668,824 B1 | 12/2003 | Isaza et al. | |
| 6,675,801 B2 | 1/2004 | Wallace et al. | |
| 6,718,974 B1 | 4/2004 | Moberg | |
| 6,725,447 B1 | 4/2004 | Gilman et al. | |
| 6,739,337 B2 | 5/2004 | Isaza | |
| 6,761,167 B1 | 7/2004 | Nadjafizadeh et al. | |
| 6,761,168 B1 | 7/2004 | Nadjafizadeh et al. | |
| 6,814,074 B1 | 11/2004 | Nadjafizadeh et al. | |
| 6,866,040 B1 | 3/2005 | Bourdon | |
| 6,899,103 B1 | 5/2005 | Hood et al. | |

(56) References Cited

U.S. PATENT DOCUMENTS

| | | |
|---|---|---|
| 6,924,567 B2 | 8/2005 | Killian et al. |
| 6,952,084 B2 | 10/2005 | Bruwer |
| 6,960,854 B2 | 11/2005 | Nadjafizadeh et al. |
| 6,979,502 B1 | 12/2005 | Gartstein et al. |
| 7,005,835 B2 | 2/2006 | Brooks et al. |
| 7,036,504 B2 | 5/2006 | Wallace et al. |
| 7,077,131 B2 | 7/2006 | Hansen |
| 7,080,646 B2 | 7/2006 | Wiesmann et al. |
| RE39,225 E | 8/2006 | Isaza et al. |
| 7,117,438 B2 | 10/2006 | Wallace et al. |
| RE39,703 E | 6/2007 | Burroughs et al. |
| 7,252,088 B1 | 8/2007 | Nieves-Ramírez |
| 7,268,660 B2 | 9/2007 | Bolda et al. |
| 7,270,126 B2 | 9/2007 | Wallace et al. |
| 7,320,321 B2 | 1/2008 | Pranger et al. |
| 7,339,350 B2 | 3/2008 | Kubale et al. |
| 7,369,757 B2 | 5/2008 | Farbarik |
| 7,370,650 B2 | 5/2008 | Nadjafizadeh et al. |
| RE40,506 E | 9/2008 | Burroughs et al. |
| 7,428,902 B2 | 9/2008 | Du et al. |
| 7,460,959 B2 | 12/2008 | Jafari |
| 7,487,773 B2 | 2/2009 | Li |
| 7,654,802 B2 | 2/2010 | Crawford, Jr. et al. |
| 7,694,677 B2 | 4/2010 | Tang |
| 7,721,736 B2 | 5/2010 | Urias et al. |
| 7,741,815 B2 | 6/2010 | Cassidy |
| 7,784,461 B2 | 8/2010 | Figueiredo et al. |
| 7,823,588 B2 | 11/2010 | Hansen |
| 7,855,716 B2 | 12/2010 | McCreary et al. |
| 8,021,310 B2 | 9/2011 | Sanborn et al. |
| 2001/0011845 A1 | 8/2001 | Simonelli et al. |
| 2003/0025690 A1 | 2/2003 | Crooks .................. 345/211 |
| 2003/0170532 A1 | 9/2003 | Plumadore .............. 429/90 |
| 2005/0039748 A1 | 2/2005 | Andrieux |
| 2005/0052085 A1 | 3/2005 | Chang et al. |
| 2005/0139212 A1 | 6/2005 | Bourdon |
| 2006/0134513 A1 | 6/2006 | Tsumura et al. ........... 429/100 |
| 2006/0164036 A1* | 7/2006 | Ulla et al. ................ 320/114 |
| 2007/0017515 A1 | 1/2007 | Wallace et al. |
| 2007/0051663 A1* | 3/2007 | Foreman et al. ............ 206/703 |
| 2007/0077200 A1 | 4/2007 | Baker |
| 2007/0152630 A1 | 7/2007 | Winkler et al. |
| 2007/0273216 A1 | 11/2007 | Farbarik |
| 2008/0053441 A1 | 3/2008 | Gottlib et al. |
| 2008/0072896 A1 | 3/2008 | Setzer et al. |
| 2008/0072902 A1 | 3/2008 | Setzer et al. |
| 2010/0104929 A1 | 4/2010 | Schäfer et al. |
| 2010/0253288 A1 | 10/2010 | Cassidy |

OTHER PUBLICATIONS

7200 Series Ventilator, Options, and Accessories: Operators Manual. Nellcor Puritan Bennett, Part No. 22300 A, Sep. 1990, pp. 1-196.

7200 Ventilatory System: Addendum/Errata. Nellcor Puritan Bennett, Part No. 4-023576-00, Rev. A, Apr. 1998, pp. 1-32.

800 Operators and Technical Reference Manual. Series Ventilator System, Nellcor Puritan Bennett, Part No. 4-070088-00, Rev. L, Aug. 2010, pp. 1-476.

840 Operators and Technical Reference Manual. Ventilator System, Nellcor Puritan Bennett, Part No. 4-075609-00, Rev. G, Oct. 2006, pp. 1-424.

* cited by examiner

POWER SUPPLY INTERFACE SYSTEM FOR A BREATHING ASSISTANCE SYSTEM

TECHNICAL FIELD

The present invention relates generally to breathing assistance systems, e.g., a power supply interface system for a breathing assistance system.

BACKGROUND

Breathing assistance systems are generally operable to provide breathing assistance to a patient. Examples of breathing assistance systems include ventilators, continuous positive airway pressure (CPAP) systems, and bi-level positive airway pressure (BiPAP) systems. In certain breathing assistance systems, one or more self contained power supplies (e.g., one or more batteries) may supply power to the systems. Such self contained power supplies may reduce or eliminate the need for a nearby electrical outlet to supply power.

SUMMARY

In accordance with one embodiment of the present disclosure, a power supply interface system for a medical device may include a battery compartment and a battery interlocking system. The battery compartment may define at least a first battery area and a second battery area, the first battery area configured to receive a first battery and the second battery area configured to receive a second battery. The battery interlocking system may include a first interlock mechanism including a first locking portion and a first selector. The first locking portion may be configured to move between a locking position and a non-locking position, the locking position substantially preventing removal of the first battery from the first battery area, and the non-locking position not preventing removal of the first battery from the first battery area. The first selector may be configured to move the first locking portion from the locking position to the non-locking position in response to the second battery being received in the second battery area.

In accordance with another embodiment of the present disclosure, a power supply interface system for a medical device may include a battery compartment and a battery interlocking system. The battery compartment may define at least a first battery area and a second battery area, the first battery area configured to receive a first battery and the second battery area configured to receive a second battery. The battery interlocking system may include a first interlock mechanism and a second interlock mechanism. The first interlock mechanism may be configured to be moved between a locking position and a non-locking position in response to the second battery being received in the second battery area, the locking position substantially preventing removal of the first battery from the first battery area, and the non-locking position not preventing removal of the first battery from the first battery area. The second interlock mechanism may be configured to move between a locking position and a non-locking position in response to the first battery being received in the first battery area, the locking position substantially preventing removal of the second battery from the second battery area, and the non-locking position allowing removal of the second battery from the second battery area.

In accordance with another embodiment of the present disclosure, a method for managing the removal of batteries from a power supply interface system is provided. The method includes receiving a first battery in a first battery area of a battery compartment. The first battery may be restrained in the first battery area at least by a first interlock mechanism. The first interlock mechanism may include a first locking portion configured to move between a locking position and a non-locking position, the locking position substantially preventing removal of the first battery from the first battery area, and the non-locking position not preventing removal of the first battery from the first battery area. The first interlock mechanism may also include a first selector configured to move the first locking portion from the locking position to the non-locking position. The method further includes receiving a second battery in a second battery area of the battery compartment. Receiving the second battery in the second battery area may actuate the first selector to move the first locking portion from the locking position preventing removal of the first battery from the first battery area to the non-locking position not preventing removal of the first battery from the first battery area.

In accordance with another embodiment of the present disclosure, a power supply interface system for a medical device may include battery housing means and battery interlocking means. The battery housing means may be configured for at least partially housing a first battery and a second battery and may define a first battery area and a second battery area, the first battery area configured to receive the first battery and the second battery area configured to receive the second battery. The battery interlocking means may be configured for preventing both the first and second batteries from being removed from the first and second battery areas. The battery interlocking means may include locking means and selector means. The locking means may be configured to move between a locking position and a non-locking position, the locking position substantially preventing removal of the first battery from the first battery area, and the non-locking position not preventing removal of the first battery from the first battery area. The selector means may be configured to move the locking means from the locking position to the non-locking position in response to the second battery being received in the second battery area.

DETAILED DESCRIPTION OF THE DRAWING

Selected embodiments of the disclosure may be understood by reference, in part, to FIGS. 1 through 5B, wherein like numbers refer to same and like parts. The present disclosure relates generally to power supply interfaces for breathing assistance systems (for example, ventilators, CPAP devices, or BiPAP devices).

In some embodiments, a medical device including a power supply interface system includes a battery interlocking system for managing the removal of batteries from the medical device. A battery compartment of the power supply interface system may include a plurality of battery areas, each battery area configured to receive a battery. The battery interlocking system may be coupled to or otherwise associated with the battery compartment, and may include one or more interlock mechanisms. An interlock mechanism may include a locking portion and a selector. The locking portion may be configured to move between a locking position and a non-locking position, the locking position substantially preventing removal of a first battery from a battery area, and the non-locking position not preventing removal of the first battery from the first battery area. The selector may move the locking portion from the locking position to the non-locking position when a second battery is inserted into a second battery area. In this (or similar) manner, the battery interlocking system may be operable to maintain a minimum number of batteries (e.g., one battery) in the battery compartment (i.e., the battery interlocking system may allow for the removal of all but a minimum number of batteries from the battery compartment).

Figure 1A:
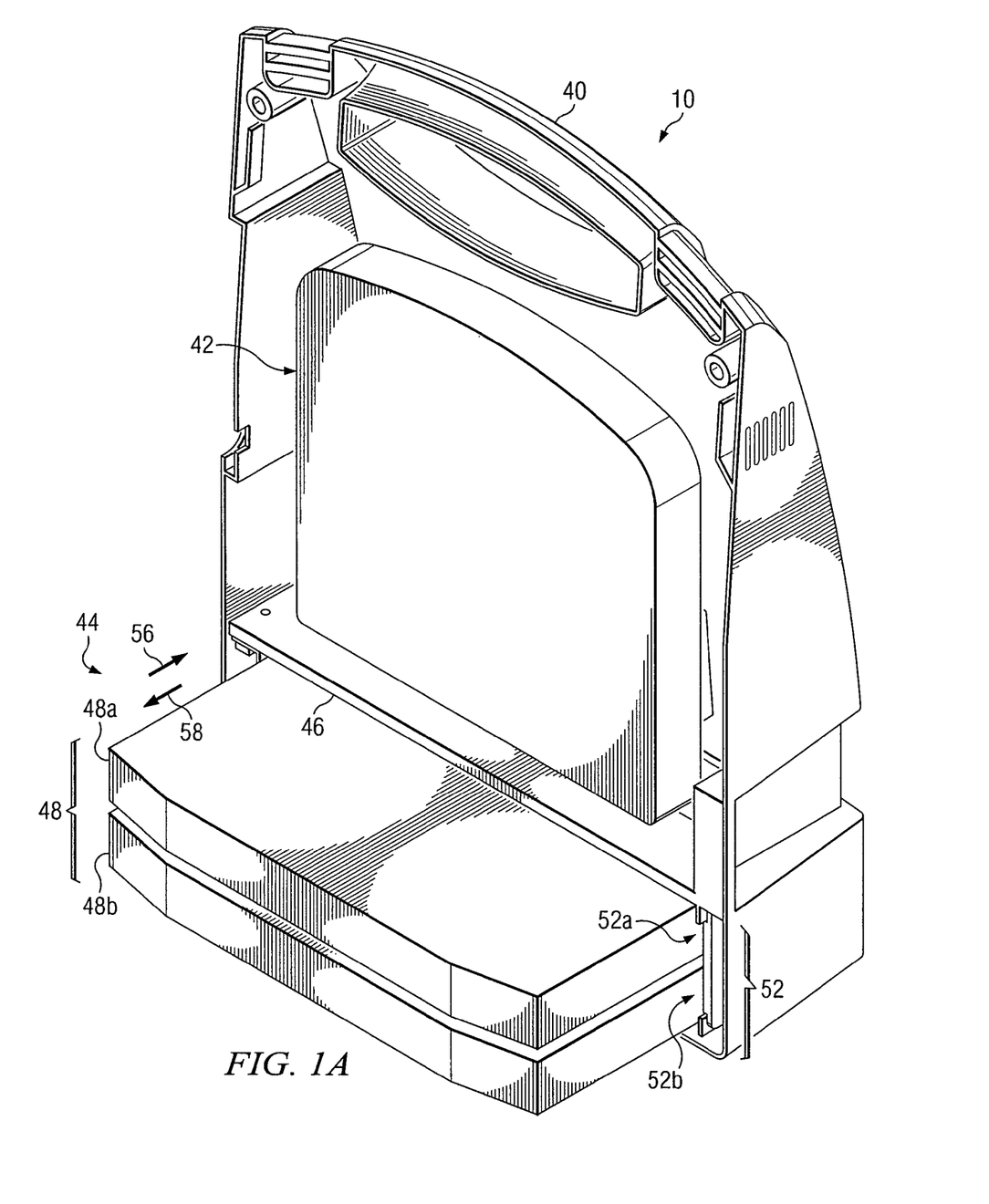
FIGS. 1A and 1B illustrate an example breathing assistance system having a power supply interface system, according to one embodiment of the disclosure.
Figure 1B:
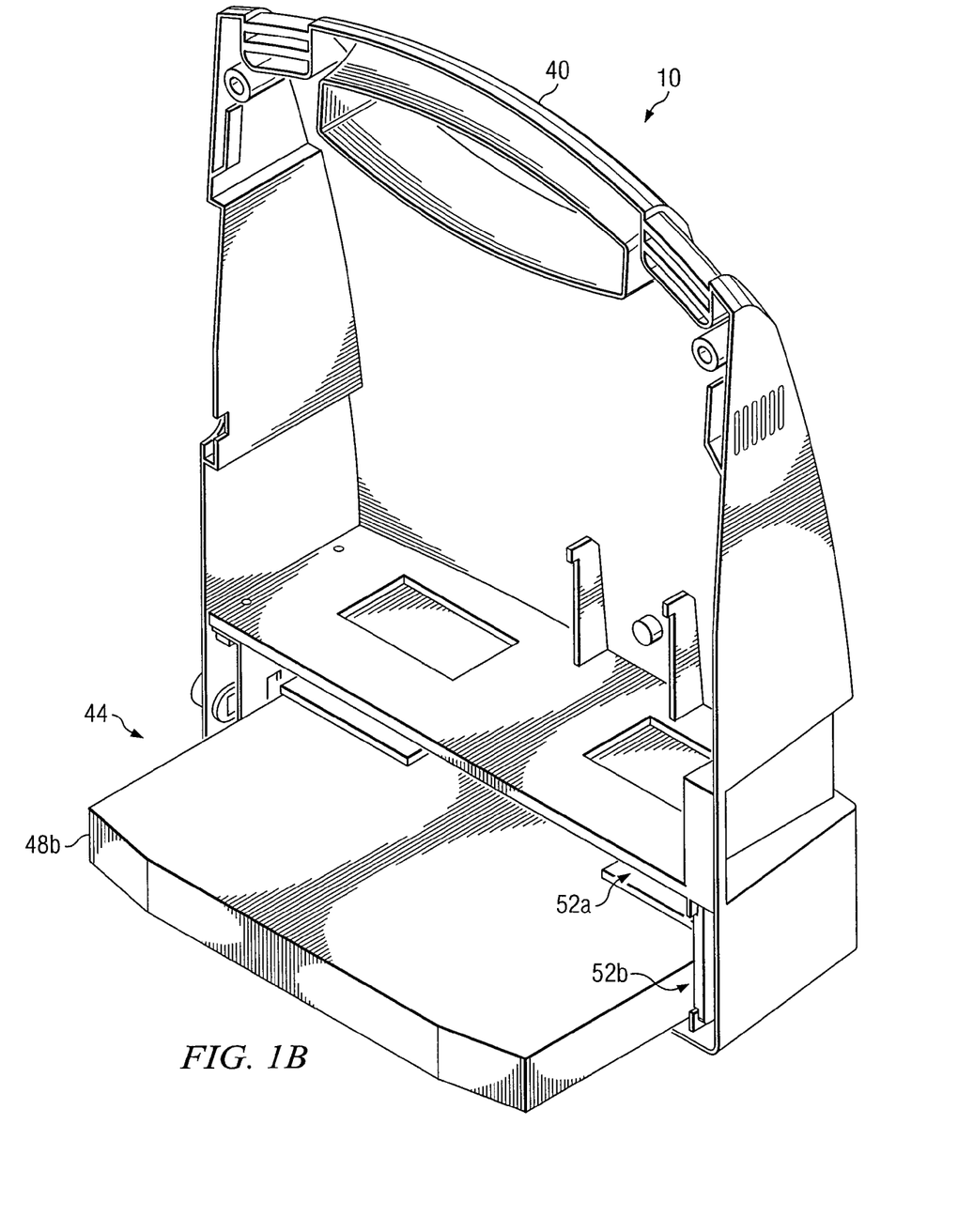

FIGS. 1A and 1B illustrate an example breathing assistance system 10 having a power supply interface system 44, according to one embodiment of the disclosure. Power supply interface system 44 may be operable to receive a plurality of batteries 48 (e.g., two batteries 48) for providing power to one or more components of breathing assistance system 10. In some embodiments, a minimum number of batteries 48 may be required or appropriate to operate breathing assistance system 10, where the minimum number may be less than the plurality of batteries 48. For example, system 10 may be configured to receive two batteries 48 but may need only one of the two batteries 48 to operate. According to one embodiment, power supply interface system 44 may include a battery interlocking system that prevents or inhibits a user from removing batteries 48 that would leave less than the minimum number of batteries coupled to power supply interface system 44, thus avoiding unintentional or undesirable disruption of power to breathing assistance system 10.

As used herein, the term "patient" may refer to any person or animal that may receive breathing assistance from system 10, regardless of the medical status, official patient status, physical location, or any other characteristic of the person. Thus, for example, patients may include persons under official medical care (e.g., hospital patients), persons not under official medical care, persons receiving care at a medical care facility, persons receiving home care, etc. As used herein, the term "user" may refer to any human who can operate breathing assistance system 10 to assist the patient to breathe. In some cases, a user may be the patient. That is, the patient may use system 10 to assist in his or her own breathing. In other cases, a user may be distinct from the patient (e.g., a caregiver). That is, the user may use system 10 to assist the patient to breathe.

According to the illustrated embodiment, breathing assistance system 10 may include a housing 40, internal components 42, and/or a power supply interface system 44 operable to receive a plurality of batteries 48. Housing 40 may be configured to protect internal components 42. For example, housing 40 may be shaped such that internal components 42 fit within housing 40. Housing 40 may be formed from one or more rigid materials suitable for protecting internal components 42, e.g., any suitable plastic, metal, acrylic, rubber, and/or other suitable rigid material. Housing 40 may also be configured to allow a user to carry breathing assistance system 10. For example, housing 40 may include a handle for carrying system 10.

Internal components 42 may include any suitable components for performing the operations of breathing assistance system 10. For example, internal components 42 may include a gas delivery system. A gas delivery system may include any device or devices configured to generate, supply, and/or deliver gas (for example, pressurized air) toward a patient. For example, a gas delivery system may include a device capable of generating pressurized air (for example, a ventilator, CPAP system, or BiPAP system), a device capable of receiving pressurized air from an outlet, one or more tanks of compressed gas, a compressor, or any other suitable source of pressurized or non-pressurized gas. As used herein, the term "gas" may refer to any one or more gases and/or vaporized substances suitable to be delivered to and/or from a patient via one or more breathing orifices (for example, the nose and/or mouth), such as air, nitrogen, oxygen, any other component of air, $CO_2$, vaporized water, vaporized medicines, and/or any combination of two or more of the above, for example.

Breathing assistance system 10 may include other components. For example, breathing assistance system 10 may include a patient interface (e.g., a mask apparatus, a tracheal tube, or other device suitable for interfacing with a patient's breathing passages) generally configured to deliver gas supplied by the gas delivery system to a patient and/or to remove exhaust gas from the patient. Breathing assistance system 10 may also include a connection system that couples the gas delivery system and the patient interface.

Power supply interface system 44 may receive one or more batteries 48 to allow batteries 48 to supply power to breathing assistance system 10. According to the illustrated embodiment, each battery 48 may be moved in a first direction 56 to insert the battery 48 into power supply interface system 44 and in a second direction 58 to remove the battery 48 from power supply interface system 44.

Figure 2:
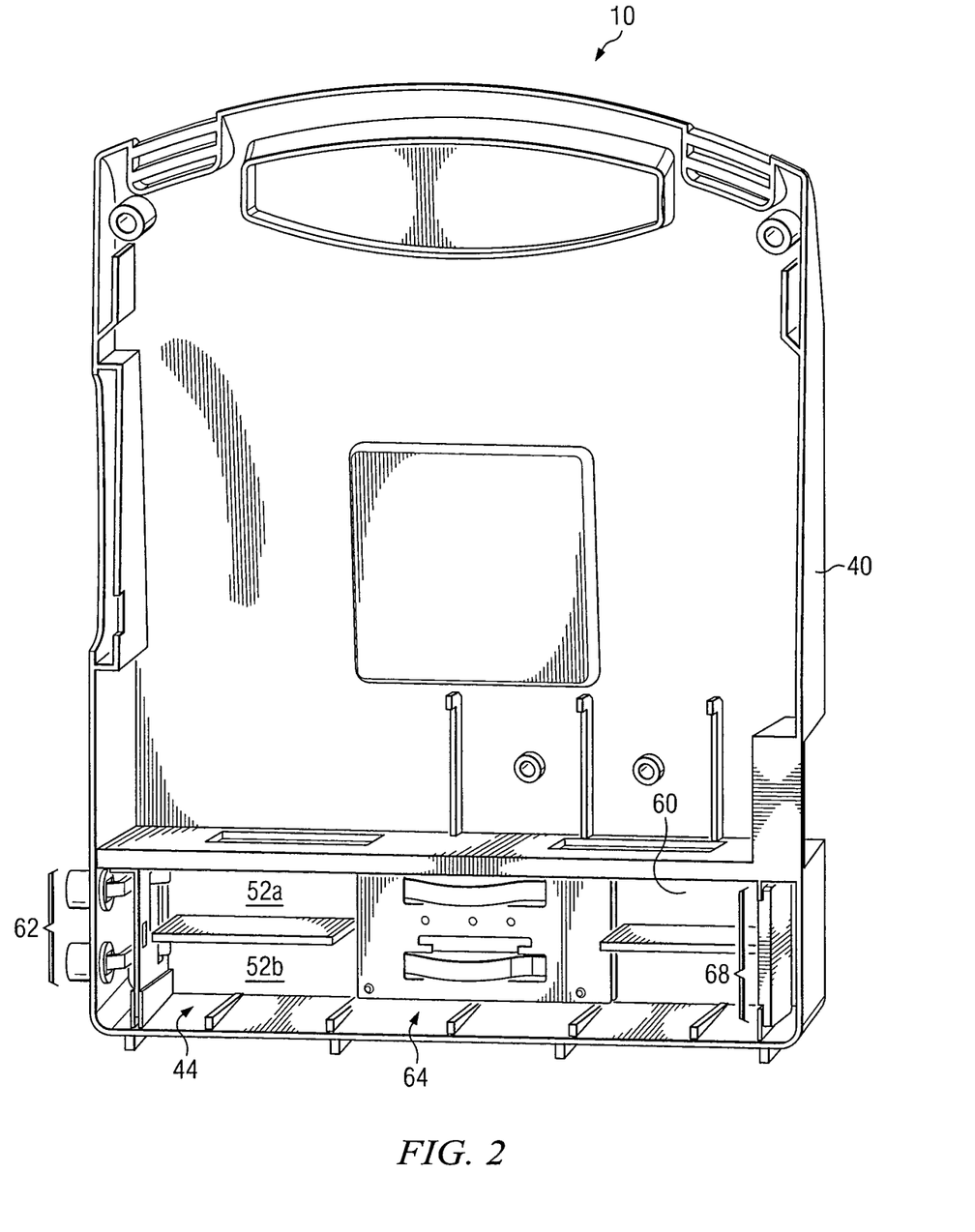
FIG. 2 illustrates a cut away view of a battery compartment of the system of FIG. 1.

Power supply interface system 44 may include a battery compartment 46 defining a plurality of battery areas 52, each battery area 52 configured to receive a battery 48. According illustrated embodiment, as shown in FIGS. 1A, 1B, and 2, battery compartment 46 may include battery areas 52a and 52b configured to receive batteries 48a and 48b, respectively. FIG. 1A illustrates batteries 48a and 48b inserted into battery areas 52a and 52b, respectively. FIG. 1B illustrates second battery 48b inserted into second battery area 52b. An example of battery compartment 46 is described in more detail with reference to FIG. 2.

A battery 48 may represent any suitable self-contained power supply operable to provide a current. As an example, battery 48 may include cells that convert chemical energy to electrical energy in order to generate a current. Any other suitable battery 48, however, may be used.

Modifications, additions, or omissions may be made to breathing assistance system 10 without departing from the scope of the invention. The components of breathing assistance system 10 may be integrated or separated according to particular needs. For example, certain components of system 10 may be coupled together and then decoupled. Moreover, the operations of breathing assistance system 10 may be performed by more, fewer, or other components.

FIG. 2 illustrates a cut away view of an example battery compartment 46 of breathing assistance system 10 of FIG. 1, according to one embodiment of the disclosure. According to the illustrated embodiment, battery compartment 46 may include a support structure 60 to which a battery restraining system 62, a battery ejection system 64, and/or a battery interlocking system 68 may be coupled as shown. Battery restraining system 62, battery ejection system 64, and/or a battery interlocking system 68 may cooperate to manage the removal of batteries 48 from battery compartment 46, as discussed in greater detail below.

Support structure 60 may include any suitable structure for providing support for batteries 48 and/or components of battery compartment 46. For example, support structure 60 may be shaped to hold batteries 48 in position and/or to place components of battery compartment 46 in suitable position relative to batteries 48. Support structure 60 may be formed from one or more rigid materials that provide sufficient protection to the internal components housed or supported by support structure 60. According to one embodiment, support structure 60 may be integral with housing 40. According to another embodiment, support structure 60 may include a structure coupled to housing 40.

Battery restraining system 62 may be operable to prevent or inhibit removal of batteries 48 from battery compartment 46. According to one embodiment, battery restraining system 62 may prevent or inhibit a particular battery 48 from being removed from a particular battery area 52. Battery restraining system 62 may move between a restraining position preventing or inhibiting removal of batteries 48 from battery compartment 46 and a non-restraining position allowing for removal of batteries 48 from battery compartment 46. An example of battery restraining system 62 is described in more detail with reference to FIGS. 3A and 3B.

Battery ejection system 64 may be operable to eject or otherwise decouple batteries 48 from battery compartment 46. According to one embodiment, battery ejection system 64 may eject or otherwise decouple a particular battery 48 from a particular battery area 52 of battery compartment 40. An example of battery ejection system 64 is described in more detail with reference to FIG. 4.

Battery interlocking system 68 may be operable to maintain a minimum number of batteries 48 in battery compartment 46 (i.e., to allow for the removal of all but a minimum number of batteries 48 from battery compartment 46). A minimum number of batteries may refer to the minimum number of batteries 48 that are required or appropriate for the operation of breathing assistance system 10. For example, at least one battery 48 may be required or appropriate for the operation of system 10. An example of battery interlocking system 68 is described in more detail with reference to FIGS. 5A and 5B.

The components of system 10 may be coupled together in any suitable manner. As an example, certain components may be mechanically coupled, e.g., using one or more of any of the following: a bolt, a rivet, a screw, a nail, a pin, a cable, a clamp, a lock, a hook, other mechanical fastener, or any combination of any of the preceding. As another example, certain components may be chemically coupled, e.g., using an adhesive and/or solder. As another example, certain components may be magnetically coupled, e.g., using one or more magnets.

Figure 3A:
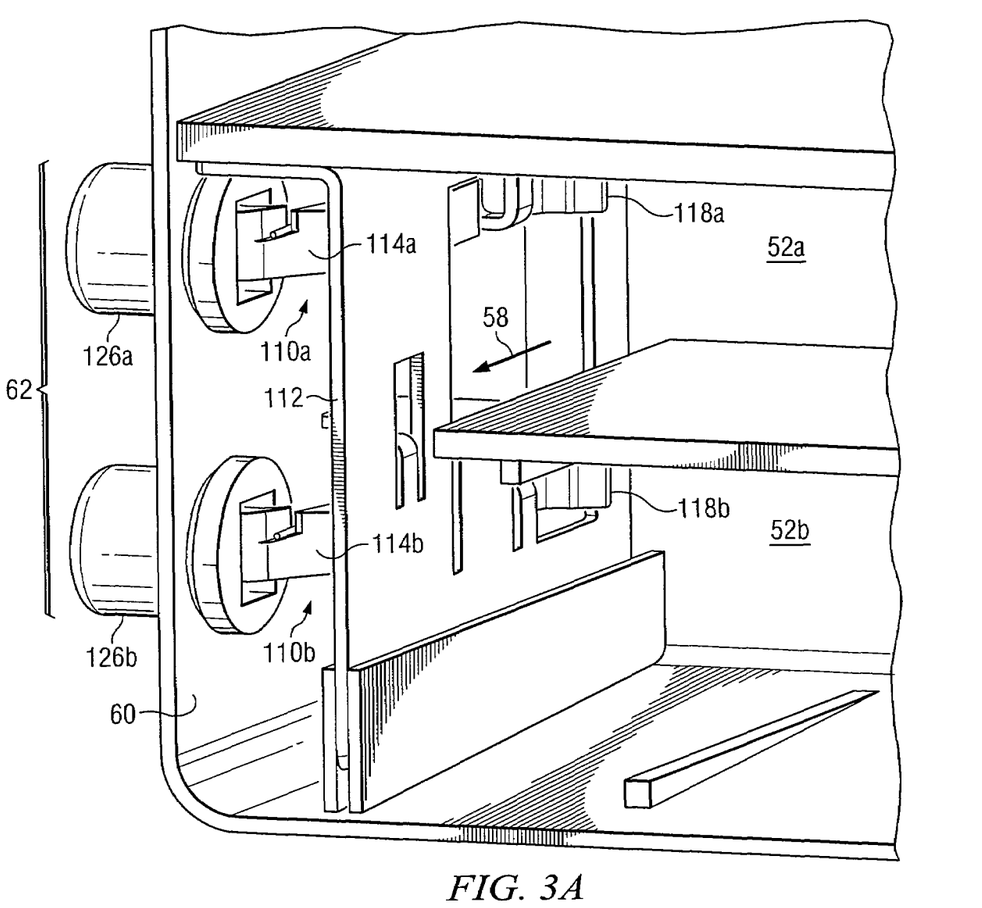
FIGS. 3A and 3B illustrate an example battery restraining system that may be used with the breathing assistance system of FIG. 1.
Figure 3B:
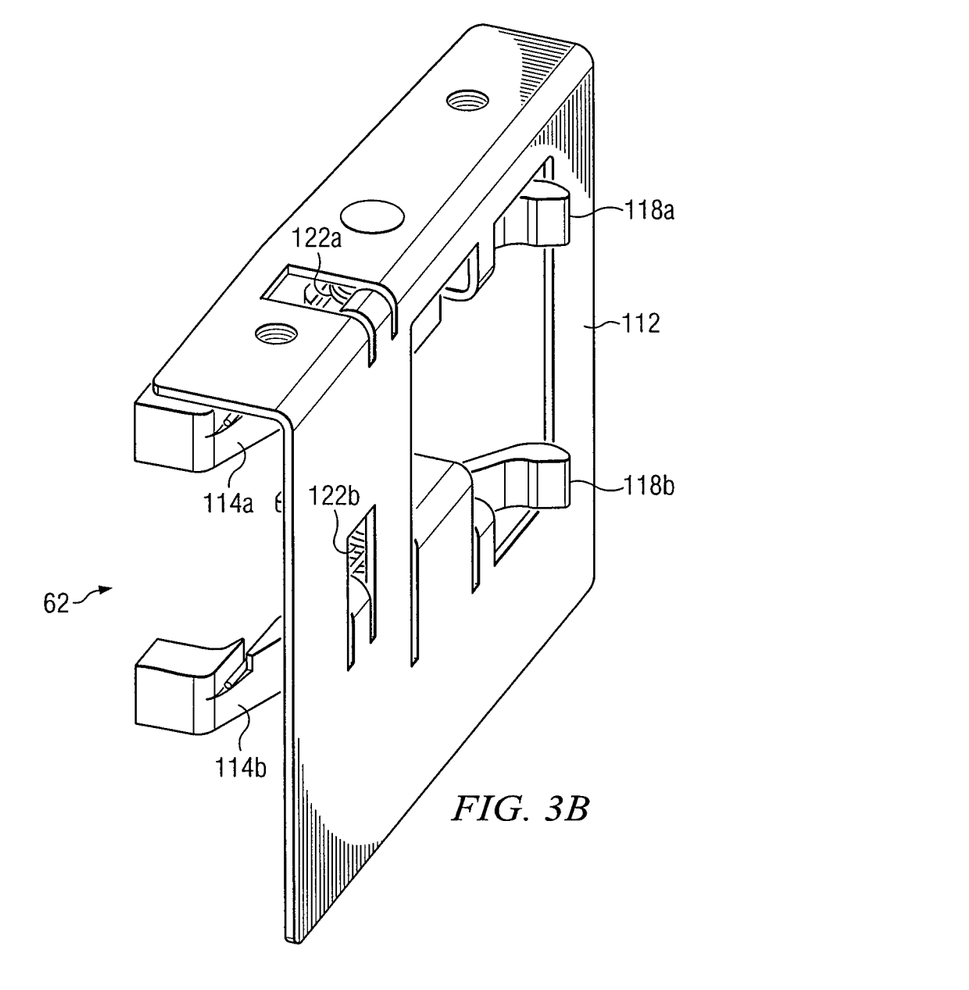

FIGS. 3A and 3B illustrate an example battery restraining system 62 that may be used with breathing assistance system 10 of FIG. 1, according to one embodiment of the disclosure. FIG. 3A illustrates battery restraining system 62 coupled to support structure 60, and FIG. 3B illustrates battery restraining system 62 separate from support structure 60.

As discussed above, battery restraining system 62 may prevent or inhibit removal of batteries 48 from battery compartment 40. Battery restraining system 62 may include a support 112 coupled to one or more restraining mechanism 110, where each restraining mechanism 110 may be operable to prevent or inhibit the removal of a battery 48 from a battery area 52. According to the illustrated embodiment, battery restraining system 62 may include restraining mechanisms 110a and 110b. Restraining mechanism 110a may be operable to prevent or inhibit the removal of first battery 48a from first battery area 52a, and restraining mechanism 110b may be operable to prevent or inhibit the removal of second battery 48b from second battery area 52b.

Each restraining mechanism 110 may include an arm 114 having a restraining latch 118. According to the illustrated embodiment, restraining mechanism 110a may include an arm 114a having a restraining latch 118a, and restraining mechanism 110b may include an arm 114b having a restraining latch 118b. Each restraining latch 118 may prevent or inhibit movement of a battery 48 in a direction that removes that battery 48 from a corresponding battery area 52. For example, restraining latch 118a may prevent or inhibit movement of first battery 48a in direction 58, and restraining latch 118b may prevent or inhibit movement of second battery 48b in direction 58.

Each restraining latch 118 may have any suitable configuration for preventing the movement of a battery 48. According to one embodiment, each restraining latch 118 may have a particular shape that prevents or inhibits the movement of a battery 48. For example, each restraining latch 118 may have a protrusion that prevents or inhibits the movement of a battery 48 and/or at least partially fits within an indentation of battery 48. Such protrusion may have any suitable cross section, for example, triangular, rectangular, polygonal, elliptical, or other shape. According to another embodiment, each restraining latch 118 may have a particular texture that creates sufficient frictional force to prevent or inhibit the movement of a battery 48. For example, each restraining latch 118 may comprise a rubber pad.

Each arm 114 may be configured to move a restraining latch 118 between a restraining position that prevents or inhibits removal of a battery and a non-restraining position that allows removal of the battery 48. Each arm 114 may have any suitable configuration for moving restraining latch 118. For example, each arm 114 may have an elongated shape configured to move about a pivot 122 to move a restraining latch 118. In the illustrated embodiment, as shown in FIG. 3B, arm 114a may be configured to move about a pivot 122a to move restraining latch 118a, and arm 114b may be configured to move about a pivot 122b to move restraining latch 118b. Each pivot 122 may comprise any suitable pivot, e.g., a spring pivot. An actuation member (e.g., a knob, button, or lever) 126 may control each arm 114 to move a restraining latch 118 between a restraining position and a non-restraining position. Each actuation member 126 may configured such that a user may manipulate actuation member 126 to move arm 114. For example, at least a portion of actuation member 126 may be located outside of housing 40.

Figure 4:
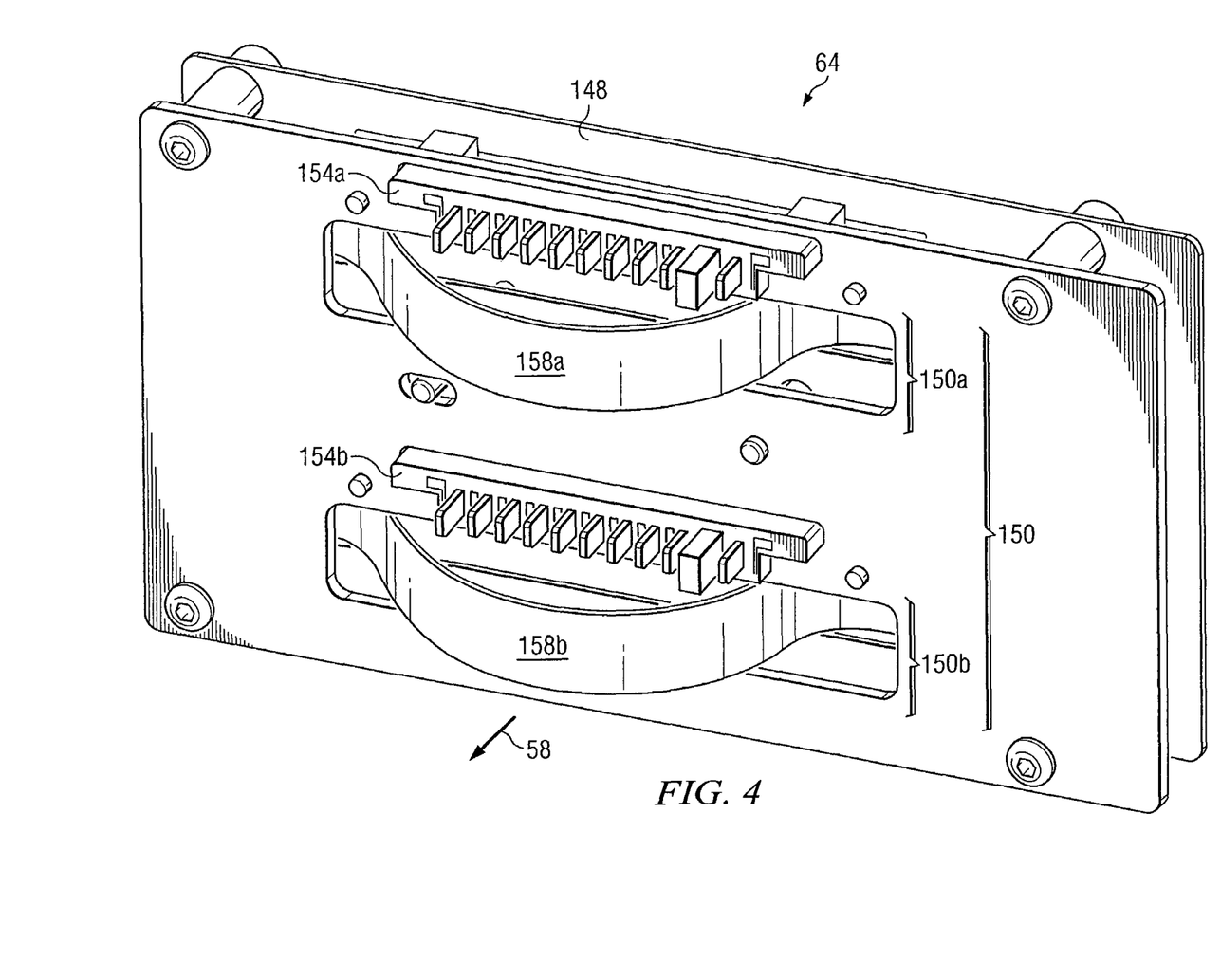
FIG. 4 illustrates an example battery ejection system that may be used with the breathing assistance system of FIG. 1.

FIG. 4 illustrates an example battery ejection system 64 that may be used with breathing assistance system 10 of FIG. 1, according to one embodiment of the disclosure. Battery ejection system 64 may be operable to eject or otherwise decouple batteries 48 from battery compartment 46, and may include a support 148 coupled to one or more ejection mechanisms 150. According to the illustrated embodiment, battery ejection system 64 may include ejection mechanisms 150a and 150b that eject or otherwise decouple batteries 48a and 48b from battery areas 52a and 52b, respectively.

According to the illustrated embodiment, ejection mechanism 150 may include an ejector 158 configured to eject or otherwise decouple each battery 48 from an interface 154. Each interface 154 may be configured to couple a battery 48 to system 10 to allow that battery 48 to provide power to one or more components of system 10. Each interface 154 may also provide an interface for charging battery 48 when system 10 is coupled to another power source, such as an electrical outlet. Each interface 154 may have any suitable configuration for coupling a battery 48 to system 10. For example, each interface 154 may include any suitable plugs, pins, and/or connectors.

Each ejector 158 may be operable to eject or otherwise decouple a battery 48 from a corresponding interface 154 when the battery 48 is not locked into place, and/or may move battery 48 in direction 58 for removal of the battery 48. According to one embodiment, an ejector 158 may decouple a battery 48 from an interface 154 if the restraining mechanism 110 for the corresponding battery area 52 is in the non-restraining position. For example, as shown in FIG. 4, a first ejector 158a may decouple battery 48a from interface 154a if restraining mechanism 110a for battery area 52a is in the non-restraining position, and a first ejector 158b may decouple battery 48b from interface 154b if restraining mechanism 110b for battery area 52b is in the non-restraining position.

In certain cases, ejector 158 may automatically eject or otherwise decouple battery 48 in response to restraining mechanism 110 moving to the non-restraining position. Each ejector 158 may include any suitable mechanism operable to eject or otherwise decouple a battery 48 when that battery 48 is not restrained or locked in position. For example, an ejector 158 may include one or more of any of the following: a spring, a resilient member, a lever, and/or an elastic member.

Figure 5A:
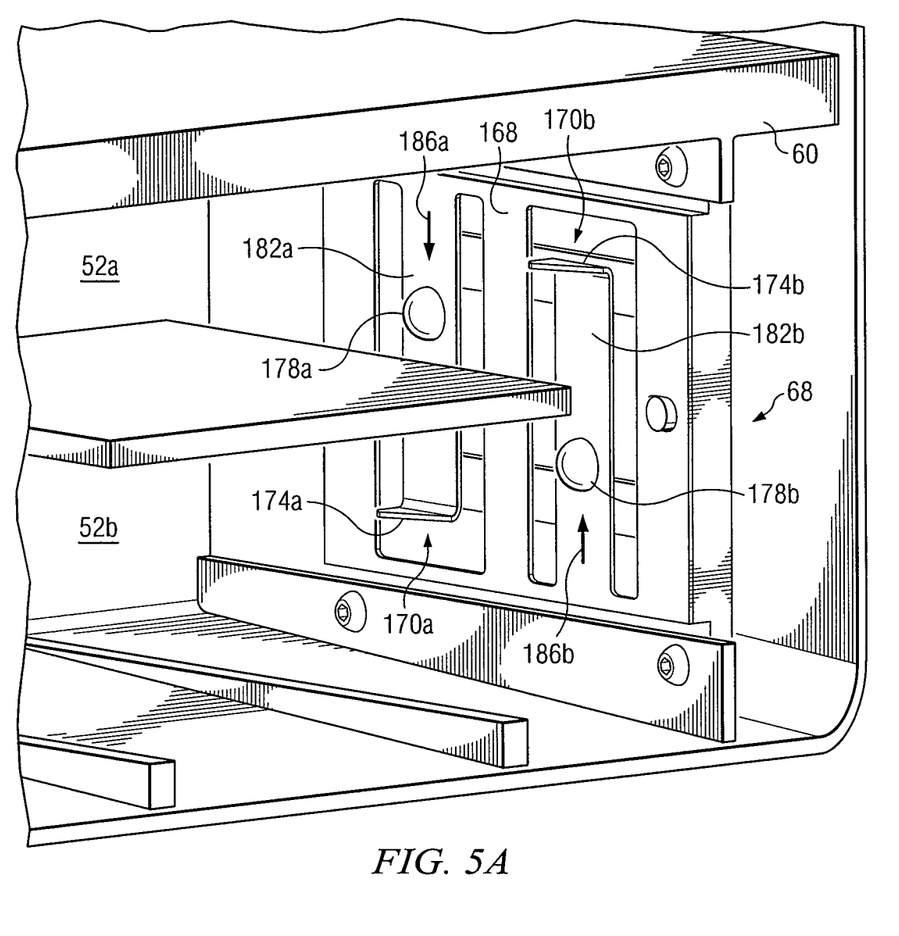
FIGS. 5A and 5B illustrate an example battery interlocking system that may be used with the breathing assistance system of FIG. 1.
Figure 5B:
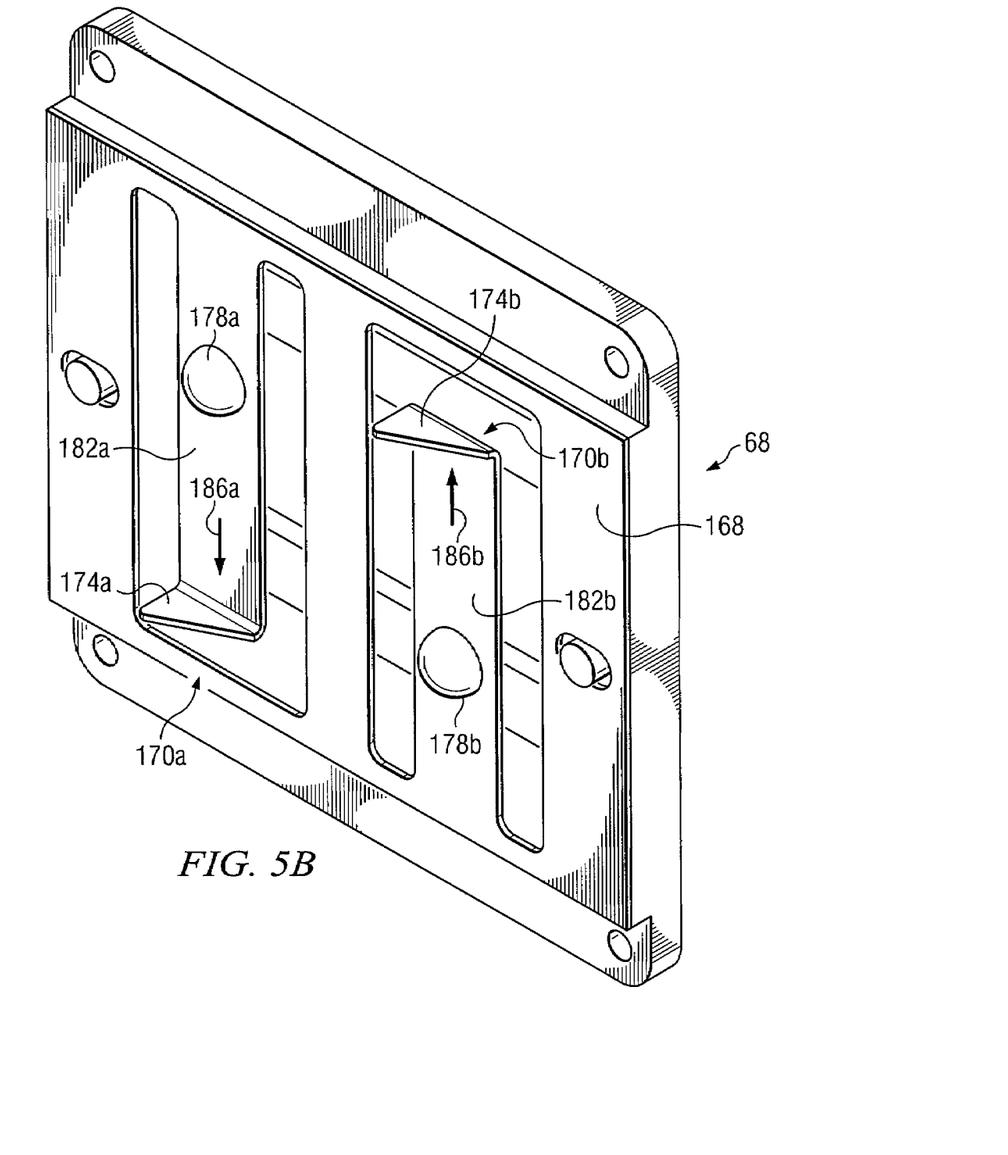

FIGS. 5A and 5B illustrate an example battery interlocking system 68 that may be used with breathing assistance system 10 of FIG. 1, according to one embodiment of the disclosure. FIG. 5A illustrates battery interlocking system 68 coupled to support structure 60, and FIG. 5B illustrates battery interlocking system 68 separate from support structure 60. Battery interlocking system 68 may be operable to maintain a minimum number of batteries 48 in battery compartment 46 (i.e., allowing for the removal of all but a minimum number of batteries 48 from battery compartment 46). Battery interlocking system 68 may have a support 168 operable to support and properly position one or more interlock mechanisms 170.

Each interlock mechanism 170 may allow for removal of one battery 48 from battery compartment 46 if another battery 48 is disposed within battery compartment 46, but may prevent or inhibit removal of the battery 48 from battery compartment 46 if another battery 48 is not disposed within battery compartment 46. For example, in the illustrated embodiment, battery interlocking system 68 may include a interlock mechanisms 170a and 170b. Interlock mechanisms 170a may allow for removal of first battery 48a from first battery area 52a if second battery 48b is disposed within second battery area 52b, but may prevent or inhibit removal of first battery 48a from first battery area 52a if second battery 48b is not disposed within second battery area 52b. Similarly, interlock mechanism 170b may allow for removal of second battery 48b from second battery area 52b if first battery 48a is disposed within first battery area 52a, but may prevent or inhibit removal of second battery 48b from second battery area 52b if first battery 48a is not disposed within first battery area 52a. In some embodiments, each interlock mechanism 170 comprises a bracket.

In some embodiments, each interlock mechanism 170 may include a locking portion 174, a selector 178, and/or a flexible portion 182. In the illustrated embodiment, locking portion 174 is located proximate one end of interlock mechanism 170, flexible portion 182 extends from locking portion 174 to another end coupled to support 168, and selector 178 is located along the length of flexible portion 182. However, locking portion 174, selector 178, and/or flexible portion 182 may be located at any suitable position with respect to interlock mechanism 170 and with respect to each other.

According to one embodiment, if a locking portion 174 is in a locking position, the locking portion 174 may prevent or inhibit removal of a battery 48. If locking portion 174 is in a non-locking position, locking portion 174 may allow for the removal of the battery 48. Each locking portion 174 may have any suitable configuration to prevent or inhibit the removal of a battery 48 when in the locking position and to allow for the removal of the battery 48 when in the non-locking position. Each locking portion 174 may have a particular shape or configuration that prevents or inhibits the movement of a battery 48. For example, locking portion 174 may have a protrusion, e.g., a latch or hook, that prevents or inhibits the movement of a battery 48 and/or at least partially fits within an indentation of the battery 48. The protrusion may have any suitable shape and/or cross section, for example, triangular, rectangular, polygonal, elliptical, or other shape. According to another embodiment, locking portion 174 may have a particular texture suitable to create sufficient frictional force to prevent or inhibit the movement of a battery 48. For example, locking portion 174 may include a rubber pad.

In some embodiments, an interlock mechanism 170 may be configured to allow a battery 48 to be received into a battery area 52 even when the interlock mechanism 170 is positioned in the locking position. For example, locking portion 174 may be shaped or configured to allow a battery 48 to be received into a battery area 52 when interlock mechanism 170 is positioned in the locking position, but then prevent or inhibit the battery 48 from being removed from the battery area 52. For instance, as shown in FIGS. 5A and 5B, locking portion 174 may have a triangular, angled, curved, or other suitable shape allowing a battery 48 to move interlock mechanism 170 into a flexed position to allow the battery 48 to be inserted into a battery area 52. Once the battery 48 is sufficiently inserted into the battery area 52, locking portion 174 may fit into a slot or indention in battery 48, allowing interlock mechanism 170 to spring back into the locking position preventing or inhibiting battery 48 from being removed from battery area 52. In other embodiments, interlock mechanism 170 may include a user interface (e.g., a know or handle on an outer side of interlock mechanism 170) allowing a user to manually move interlock mechanism 170 in order to insert battery 48 into battery area 52.

Each selector 178 may be operable to move a locking portion 174 between a locking position and a non-locking position. According to one embodiment, each selector 178 comprises a protrusion, which may move locking portion 174 from the locking position to the non-locking position when the protrusion is contacted by a battery 48 inserted in battery area 52. Such protrusion may have any suitable shape and/or cross section, e.g., triangular, rectangular, polygonal, elliptical, or other shape.

Flexible portion 182 may allow for movement of interlock mechanism 170 between the locking position and the non-locking position. According to one embodiment, flexible portion 182 may bend or flex from an undeformed state to a deformed state when a battery 48 is placed in a corresponding battery area 52 to allow for movement of interlock mechanism 170 from the locking position to the non-locking position, and may return to the undeformed state when the battery 48 is removed from the battery area 52 to move interlock mechanism 170 from the non-locking position to the locking position.

Flexible portion 182 may have any suitable configuration to allow for sufficient movement of interlock mechanism 170. In some embodiments, flexible portion 182 may be formed from one or more materials operable to provide suitable flexibility, e.g., any suitable plastics, acrylics, metals, and/or rubber. In other embodiments, flexible portion 182 may include multiple members coupled together by a joint that provides the required flexibility. Examples of such joint may include a hinge, a spring, and/or a clasp.

As discussed above, battery interlocking system 68 may include interlock mechanisms 170a and 170b. In the illustrated embodiment, interlock mechanism 170a extends generally in a first direction 186a, while interlock mechanism 170b extends generally in a first direction 186b generally opposite to first direction 186a. However, in other embodiments, interlock mechanisms 170a and 170b may extend in any other directions relative to each other and/or relative to other components of battery interlocking system 68 or system 10.

According to the illustrated embodiment, if first battery 48a is not locked into first battery area 52a, interlock mechanism 170a may prevent or inhibit removal of second battery 48b from second battery area 52b. If first battery 48a is locked into first battery area 52a, selector 178a moves locking portion 174a from the locking position to the non-locking position to allow for removal of second battery 48b from second battery area 52b. Similarly, if second battery 48b is not locked into second battery area 52b, interlock mechanism 170b prevents or inhibits removal of first battery 48a from first battery area 52a. If second battery 48b is locked into second battery area 52b, selector 178b moves locking portion 174b from the locking position to the non-locking position to allow for removal of first battery 48a from first battery area 52a.

Battery interlocking system 68 may be formed from one or more suitable materials, e.g., any suitable plastic, metal, acrylic, rubber, and/or other suitable rigid material. Battery interlocking system 68 may include any suitable number of parts operable to perform the functions discussed herein. According to one embodiment, battery interlocking system 68 may comprise one part from which the components of battery interlocking system 68 are formed. According to other embodiments, battery interlocking system 68 may include multiple parts coupled together. For example, support 168, interlock mechanism 170a, and interlock mechanism 170b may be separate components coupled together. As another example, locking portion 174a, selector 178a, and flexible portion 182a may be separate components coupled together.

The parts of battery interlocking system 68 may be coupled together in any suitable manner. As an example, certain components may be mechanically coupled, e.g., using one or more of any of the following: a bolt, a rivet, a screw, a nail, a pin, a cable, a clamp, a lock, a hook, other mechanical fastener, or any combination of any of the preceding. As another example, certain components may be chemically coupled, e.g., using an adhesive and/or solder. As another example, certain components may be magnetically coupled, e.g., using one or more magnets.

As mentioned above, battery restraining system 62, battery ejection system 64, and/or a battery interlocking system 68 may cooperate to manage the removal of batteries 48 from battery compartment 46. In some embodiments, a battery 48 may only be removed from a battery area 52 if neither battery restraining system 62 nor battery interlocking system 68 is restraining or locking the battery 48 in position. For example, first battery 48a may only be removed from first battery area 52a if neither restraining mechanism 110a nor interlock mechanism 170a is restraining or locking first battery 48a in first battery area 52a. In other words, if either restraining mechanism 110a or interlock mechanism 170a is restraining or locking first battery 48a in first battery area 52a, first battery 48a may not be removed from first battery area 52a. Thus, if a user moves actuation element 126a to move restraining latch 118a to a non-restraining position (as discussed above regarding FIG. 3A), first battery 48a may only be ejected if interlock mechanism 170a is positioned in a non-restraining position.

When second battery 48b is present in second battery area 52b, interlock mechanism 170a is positioned in a non-restraining position, and thus first battery 48a may be ejected by moving actuation element 126a to move restraining latch 118a to the non-restraining position. When restraining latch 118a is moved to the non-restraining position, ejector 158a of battery ejection system 64 may automatically eject first battery 48a from first battery area 52a.

However, when second battery 48b is not present in second battery area 52b, interlock mechanism 170a is positioned in a restraining position, and thus first battery 48a may not be ejected using actuation element 126a of battery restraining system 62. Even if the user moves actuation element 126a to move restraining latch 118a to the non-restraining position, interlock mechanism 170a restrains first battery 48a in first battery area 52a.

Similar interaction between restraining mechanism 110b, interlock mechanism 170a, and ejector 158b may operate to manage the ejection of second battery 48b from second battery area 52b. In this manner, battery restraining system 62, battery ejection system 64, and/or a battery interlocking system 68 may cooperate to manage the removal of batteries 48 from battery compartment 46.

While the invention may be susceptible to various modifications and alternative forms, specific embodiments have been shown by way of example in the drawings and have been described in detail herein. It should be understood, however, that the invention is not intended to be limited to the particular forms disclosed. Rather, the invention is to cover all modifications, equivalents, and alternatives falling within the spirit and scope of the invention as defined by the following appended claims.

What is claimed is:

1. A power supply interface system for a medical device, the power supply interface system comprising:
   a battery compartment defining at least a first battery area and a second battery area, the first battery area configured to receive a first battery and the second battery area configured to receive a second battery; and
   a battery interlocking system associated with the battery compartment, the battery interlocking system including:
      a first interlock mechanism including:
         a first locking portion configured to move between a first locking position and a first non-locking position, wherein in the locking position the first locking portion directly physically engages with the first battery to physically restrain the first battery and thereby substantially prevent removal of the first battery from the first battery area, and wherein in the non-locking position the first locking portion does not physically engage with the first battery and thus does not prevent removal of the first battery from the first battery area; and
         a first selector configured such that during insertion of the second battery into the second battery area, the second battery physically causes the first selector to move the first locking portion from the locking position substantially preventing removal of the first battery from the first battery area to the non-locking position not preventing removal of the first battery from the first battery area;

a second interlock mechanism including:
   a second locking portion configured to move between a second locking position and a second non-locking position, wherein in the locking position the second locking portion directly physically engages with the second battery to physically restrain the second battery and thereby substantially prevent removal of the second battery from the second battery area, and wherein in the non-locking position the second locking portion does not physically engage with the second battery and thus does not prevent removal of the second battery from the second battery area; and
   a second selector configured such that during insertion of the first battery into the first battery area, the first battery physically causes the second selector to move the second locking portion from the locking position substantially preventing removal of the second battery from the second battery area to the non-locking position not preventing removal of the second battery from the second battery area.

2. A system according to claim 1, wherein the first interlock mechanism comprises a bracket.

3. A system according to claim 1, wherein the first interlock mechanism further includes a flexible portion configured to flex between an undeformed position and a deformed position to move the first locking portion between the locking position and the non-locking position.

4. A system according to claim 1, wherein:
   the first battery may be removed from the first battery area if both (a) the first restraining device is in the non-restraining position and (b) the first locking portion is in the non-locking position; and
   the first battery may not be removed from the first battery area if either (a) the first restraining device is in the restraining position or (b) the first locking portion is in the locking position.

5. A system according to claim 1, wherein the first restraining device includes:
   a restraining latch configured to move between a restraining position and a non-restraining position, the restraining position substantially preventing removal of the first battery from the first battery area, and the non-restraining position not preventing removal of the first battery from the first battery area; and
   a manual interface configured to be actuated by a user to move the restraining latch between the restraining position and the non-restraining position.

6. A system according to claim 1, wherein:
   the battery restraining system is located generally at a first side of the battery compartment, the battery interlocking system is located generally at a second side of the battery compartment generally opposite the first side of the battery compartment.

7. A system according to claim 1, further comprising a battery ejection system including a first ejection device operable to at least partially eject the first battery from the first battery area.

8. A system according to claim 7, wherein the battery ejection system further includes a second ejection device operable to at least partially eject the second battery from the second battery area.

9. A system according to claim 7, further comprising:
   a first battery interface configured to interface with the first battery to allow the first battery to supply power to one or more devices; and
   wherein the battery ejection system is operable to decouple the first battery from the first battery interface.

10. A system according to claim 1, further comprising a battery restraining system including a first restraining device configured to be manually moved between a restraining position and a non-restraining position, the restraining position substantially preventing removal of the first battery from the first battery area, and the non-restraining position not preventing removal of the first battery from the first battery area.

11. A power supply interface system for a medical device, the power supply interface system comprising:
   a battery compartment defining at least a first battery area and a second battery area, the first battery area configured to receive a first battery and the second battery area configured to receive a second battery; and
   a battery interlocking system associated with the battery compartment, the battery interlocking system including a first interlock mechanism and a second interlock mechanism;
   wherein the first interlock mechanism is configured such that during insertion of second battery into the second battery area, the second battery physically moves the first interlock mechanism between a locking position and a non-locking position, wherein in the locking position a first locking portion directly physically engages with the first battery to physically restrain the first battery and thereby substantially prevent removal of the first battery from the first battery area, and wherein in the non-locking position the first locking portion does not physically engage with the first battery and thus does not prevent removal of the first battery from the first battery area;
   wherein the second interlock mechanism is configured such that during insertion of the first battery into the first battery area, the first battery physically moves the second interlock mechanism between a locking position and a non-locking position in response to the first battery being received in the first battery area, wherein in the locking position a second locking portion directly physically engages with the second battery to physically restrain the second battery and thereby substantially prevent removal of the second battery from the second battery area, and wherein in the non-locking position the second locking portion does not physically engage with the second battery and thus does not prevent removal of the second battery from the second battery area.

12. A method for managing the removal of batteries from a power supply interface system including a battery compartment having a first battery area for receiving a first battery and a second battery area for receiving a second battery, the method comprising:
   receiving the first battery in the first battery area of the battery compartment when the second battery is not present in the second battery area, the first battery restrained in the first battery area at least by a first interlock mechanism including:
      a first locking portion configured to move between a locking position in which the first locking portion directly physically engages with the first battery and a non-locking position in which the first locking portion does not physically engage with the first battery, the locking position substantially preventing removal of the first battery from the first battery area, and the non-locking position not preventing removal of the first battery from the first battery area; and a first selector configured to move the first locking portion from the locking position to the non-locking position, wherein the first locking portion automatically engages with the first battery and moves to the locking position to lock the first battery in the first battery area as a result of the first battery being received in the first battery area when the second battery is not present in the second battery area; and receiving the second battery in the second battery area of the battery compartment when the first battery is present in the second battery area, wherein during the receiving of the second battery in the second battery area, the second battery physically actuates the first selector to move the first locking portion from the locking position in which the first locking portion directly physically engages with the first battery to prevent removal of the first battery from the first battery area to the non-locking position in which the first locking portion does not physically engage with the first battery and thus does not prevent removal of the first battery from the first battery area.

13. A method according to claim 12, wherein actuating the first selector comprises flexing an interlock between an undeformed position and a deformed position to move the first locking portion between the locking position and the non-locking position.

14. A method according to claim 12, further comprising moving a restraining device configured between a restraining position substantially preventing removal of the first battery from the first battery area to a non-restraining position not preventing removal of the first battery from the first battery area;

wherein the first battery may be removed from the first battery area if both (a) the restraining device is in the non-restraining position and (b) the first locking portion is in the non-locking position; and wherein the first battery may not be removed from the first battery area if either (a) the restraining device is in the restraining position or (b) the first locking portion is in the locking position.

15. A method according to claim 12, wherein:

the second battery is restrained in the second battery area at least by a second interlock mechanism including:

a second locking portion configured to move between a locking position and a non-locking position, the locking position substantially preventing removal of the second battery from the second battery area, and the non-locking position not preventing removal of the second battery from the second battery area; and a second selector configured to move the second locking portion from the locking position to the non-locking position; and the method further comprises removing the first battery from the first battery area, wherein removing the first battery from the first battery area actuates the second selector to move the second locking portion from the non-locking position not preventing removal of the second battery from the second battery area to the locking position preventing removal of the second battery from the second battery area.

16. A method according to claim 12, wherein:

the second battery is restrained in the second battery area at least by a second interlock mechanism including:

a second locking portion configured to move between a locking position and a non-locking position, the locking position substantially preventing removal of the second battery from the second battery area, and the non-locking position not preventing removal of the second battery from the second battery area; and a second selector configured to move the second locking portion from the locking position to the non-locking position; and the method further comprises moving a restraining device configured between a restraining position substantially preventing removal of the second battery from the second battery area to a non-restraining position not preventing removal of the second battery from the second battery area;

wherein the second battery may be removed from the second battery area if both (a) the restraining device is in the non-restraining position and (b) the second locking portion is in the non-locking position; and wherein the second battery may not be removed from the second battery area if either (a) the restraining device is in the restraining position or (b) the second locking portion is in the locking position.

17. A method for managing the removal of batteries from a power supply interface system including a battery compartment having a first battery area for receiving a first battery and a second battery area for receiving a second battery, the method comprising:

receiving the first battery in the first battery area of the battery compartment when the second battery is not present in the second battery area, the first battery restrained in the first battery area at least by a first interlock mechanism including:

a first locking portion configured to move between a locking position in which the first locking portion directly physically engages with the first battery and a non-locking position in which the first locking portion does not physically engage with the first battery, the locking position substantially preventing removal of the first battery from the first battery area, and the non-locking position not preventing removal of the first battery from the first battery area; and a first selector configured to move the first locking portion from the locking position to the non-locking position, wherein the first locking portion automatically engages with the first battery and moves to the locking position to lock the first battery in the first battery area as a result of the first battery being received in the first battery area when the second battery is not present in the second battery area;

receiving the second battery in the second battery area of the battery compartment when the first battery is present in the second battery area, wherein receiving the second battery in the second battery area actuates the first selector to move the first locking portion from the locking position preventing removal of the first battery from the first battery area to the non-locking position not preventing removal of the first battery from the first battery area; and removing the second battery from the second battery area, wherein removing the second battery from the second battery area actuates the first selector to move the first locking portion from the locking position in which the first locking portion directly physically engages with the first battery to prevent removal of the first battery from the first battery area to the non-locking position in which the first locking portion does not physically engage with the first battery and thus does not prevent removal of the first battery from the first battery area.

18. A power supply interface system for a medical device, the power supply interface system comprising:
- a battery compartment defining at least a first battery area and a second battery area, the first battery area configured to receive a first battery and the second battery area configured to receive a second battery; and
- a battery interlocking system associated with the battery compartment, the battery interlocking system including a first interlock mechanism including:
  - a first locking portion configured to move between a locking position in which the first locking portion directly physically engages with the first battery to physically restrain the first battery and thereby substantially prevent removal of the first battery from the first battery area and a non-locking position in which the first locking portion does not physically engage with the first battery and thus does not prevent removal of the first battery from the first battery area; and
  - a first selector configured to move the first locking portion from the locking position in which the first locking portion directly physically engages with the first battery to prevent removal of the first battery from the first battery area to the non-locking position in which the first locking portion does not physically engage with the first battery and thus does not prevent removal of the first battery from the first battery area, in response to the second battery being received in the second battery area; and
- wherein removing the second battery from the second battery area actuates the first selector to move the first locking portion from the non-locking position not preventing removal of the first battery from the first battery area to the locking position preventing removal of the first battery from the first battery area.

* * * * *